(12) United States Patent
Chen et al.

(10) Patent No.: US 11,163,773 B2
(45) Date of Patent: Nov. 2, 2021

(54) EFFECTIVE PARTITION PRUNING USING GLOBALLY ENCODED PARTITIONS

(71) Applicant: SAP SE, Walldorf (DE)

(72) Inventors: Yu-Jui Chen, Waterloo (CA); Reza Sherkat, Waterloo (CA); John Smirnios, Kitchener (CA); Mihnea Andrei, Issy les Moulineaux (FR)

(73) Assignee: SAP SE, Walldorf (DE)

( * ) Notice: Subject to any disclaimer, the term of this patent is extended or adjusted under 35 U.S.C. 154(b) by 327 days.

(21) Appl. No.: 15/964,624

(22) Filed: Apr. 27, 2018

(65) Prior Publication Data

US 2019/0236193 A1     Aug. 1, 2019

Related U.S. Application Data

(60) Provisional application No. 62/623,429, filed on Jan. 29, 2018.

(51) Int. Cl.
*G06F 16/2455* (2019.01)
*G06F 16/242* (2019.01)
*G06F 16/27* (2019.01)
*G06F 16/22* (2019.01)

(52) U.S. Cl.
CPC .... *G06F 16/24561* (2019.01); *G06F 16/2282* (2019.01); *G06F 16/242* (2019.01); *G06F 16/278* (2019.01)

(58) Field of Classification Search
CPC ............. G06F 16/24561; G06F 16/242; G06F 16/2282; G06F 16/278
See application file for complete search history.

(56) References Cited

U.S. PATENT DOCUMENTS

| 5,761,652 | A | * | 6/1998 | Wu | G06F 16/2264 |
| 5,963,935 | A | * | 10/1999 | Ozbutun | G06F 16/24558 |
| 8,429,165 | B1 | * | 4/2013 | Jung | G06F 9/505 |
| | | | | | 707/737 |
| 8,903,803 | B1 | * | 12/2014 | Aly | G06F 16/2264 |
| | | | | | 707/713 |
| 2002/0095421 | A1 | * | 7/2002 | Koskas | G06F 16/284 |

(Continued)

OTHER PUBLICATIONS

Alexiou, K. et al. "Adaptive Range Filters for Cold Data: Avoiding Trips to Siberia," Proceedings of the VLDB Endowment, vol. 6, No. 14, Aug. 26-30, 2013, pp. 1714-1725.

(Continued)

*Primary Examiner* — Alford W Kindred
*Assistant Examiner* — Lin Lin M Htay
(74) *Attorney, Agent, or Firm* — Sterne, Kessler, Goldstein & Fox P.L.L.C.

(57) ABSTRACT

Disclosed herein are system, method, and computer program product embodiments for partition pruning using globally encoded range partition information. An embodiment operates by partitioning a data table into a plurality of data partitions, determining a plurality of sub-partitions within the data partitions, and determining a global range table based at least in part on value ranges corresponding to the sub-partitions. Further, the global range table may be used to determine bit vectors for the data partitions and query predicates. In some examples, the bit vectors may be used to determine whether to prune data partitions during execution of a query over a large data volume.

21 Claims, 7 Drawing Sheets

(56) References Cited

U.S. PATENT DOCUMENTS

| | | | | |
|---|---|---|---|---|
| 2002/0174410 | A1* | 11/2002 | Chakraborty | G06F 30/392 716/124 |
| 2003/0149698 | A1* | 8/2003 | Hoggatt | G06F 16/2282 |
| 2008/0288739 | A1* | 11/2008 | Bamba | G06F 9/5083 711/172 |
| 2010/0094870 | A1* | 4/2010 | Narang | G06F 16/93 707/736 |
| 2010/0114840 | A1* | 5/2010 | Srivastava | G06F 21/6254 707/688 |
| 2015/0220529 | A1* | 8/2015 | Eltabakh | G06F 16/182 707/719 |
| 2016/0041906 | A1* | 2/2016 | Mukherjee | G06F 16/2379 711/119 |
| 2016/0292220 | A1* | 10/2016 | Verma | G06F 16/24537 |

OTHER PUBLICATIONS

Bloom, B.H., "Space/Time Trade-offs in Hash Coding with Allowable Errors," Communications of the ACM, vol. 13, No. 7, Jul. 1970, pp. 422-426.

Interval scheduling—Wikipedia, Retrieved from https://en.wikipedia.org/w/index.php?title=Interval_scheduling&oldid=925571469, last updated Nov. 10, 2019, 6 pages.

Li, Y. et al., "A Padded Encoding Scheme to Accelerate Scans by Leveraging Skew," SIGMOD'15, May 31-Jun. 4, 2015, pp. 1509-1524.

Moerkotte, G., "Small Materialized Aggregates: A Light Weight Index Structure for Data Warehousing," Proc. of the 24th VLDB Conf., 1998, pp. 476-487.

Nica, A. et al., "Statisticum: Data Statistics Management in SAP HANA," Proc. of the VLDB Endowment, vol. 10, No. 12, 2017, pp. 1658-1669.

Sun, L. et al., "Fine-grained Partitioning for Agressive Data Skipping," SIGMOD'14, Jun. 22-27, 2014, 12 pages.

Sun, L. et al., "Skipping-oriented Partitioning for Columnar Layouts," Proc. of the VLDB Endowment, vol. 10, No. 4, 2016, pp. 421-432.

TPC-H, Retrieved from www.tpc.org/tpch/, Copyright 1988-2020, 1 page.

* cited by examiner

FIG. 6A

| | Age | Income (10K) |
|---|---|---|
| R₁ | 18 | 1 |
| R₂ | 19 | 3 |
| R₃ | 22 | 6 |
| R₄ | 28 | 8 |
| R₅ | 29 | 9 |
| R₆ | 29 | 13 |
| R₇ | 30 | 5 |
| R₈ | 35 | 7 |
| R₉ | 35 | 8 |
| R₁₀ | 40 | 11 |
| R₁₁ | 42 | 11 |
| R₁₂ | 45 | 12 |
| R₁₃ | 51 | 15 |
| R₁₄ | 55 | 16 |

FIG. 6B

| Partition | Sub-partition | Range | Bit Vector |
|---|---|---|---|
| P₁ | R₁, R₂ | [1-3] | 01011 |
| | R₃, R₄, R₅ | [6-9] | |
| | R₆ | [13-13] | |
| P₂ | R₇ | [5-5] | 00110 |
| | R₈, R₉ | [7-8] | |
| | R₁₀, R₁₁, R₁₂ | [11-12] | |
| P₃ | R₁₃ | [15-15] | 10000 |
| | R₁₄ | [16-16] | |

EFFECTIVE PARTITION PRUNING USING GLOBALLY ENCODED PARTITIONS

BACKGROUND

Generally, in-memory databases rely on secondary data indices to improve the performance of query processing on large data volumes. One performance enhancing approach that makes use of secondary indices is synopsis-based partition pruning. In synopsis-based partition pruning implementations (e.g., zone maps, synopsis tables), a system may maintain synopsis information (e.g., minimal and maximal data values, probabilistic information), and use the synopsis information to determine whether to prune the data partition during the execution of a query. However, some synopsis based approaches become inefficient and suffer from an untenable number of false positives depending upon one or more attributes of the data stored (e.g., data sparsity) within a partition.

BRIEF DESCRIPTION OF THE DRAWINGS

The accompanying drawings are incorporated herein and form a part of the specification.

FIGS. 6A-6B illustrate data structures representing information of a partitioned data table, according to embodiments of the present disclosure.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for partition pruning using globally encoded partition information.

Figure 1:
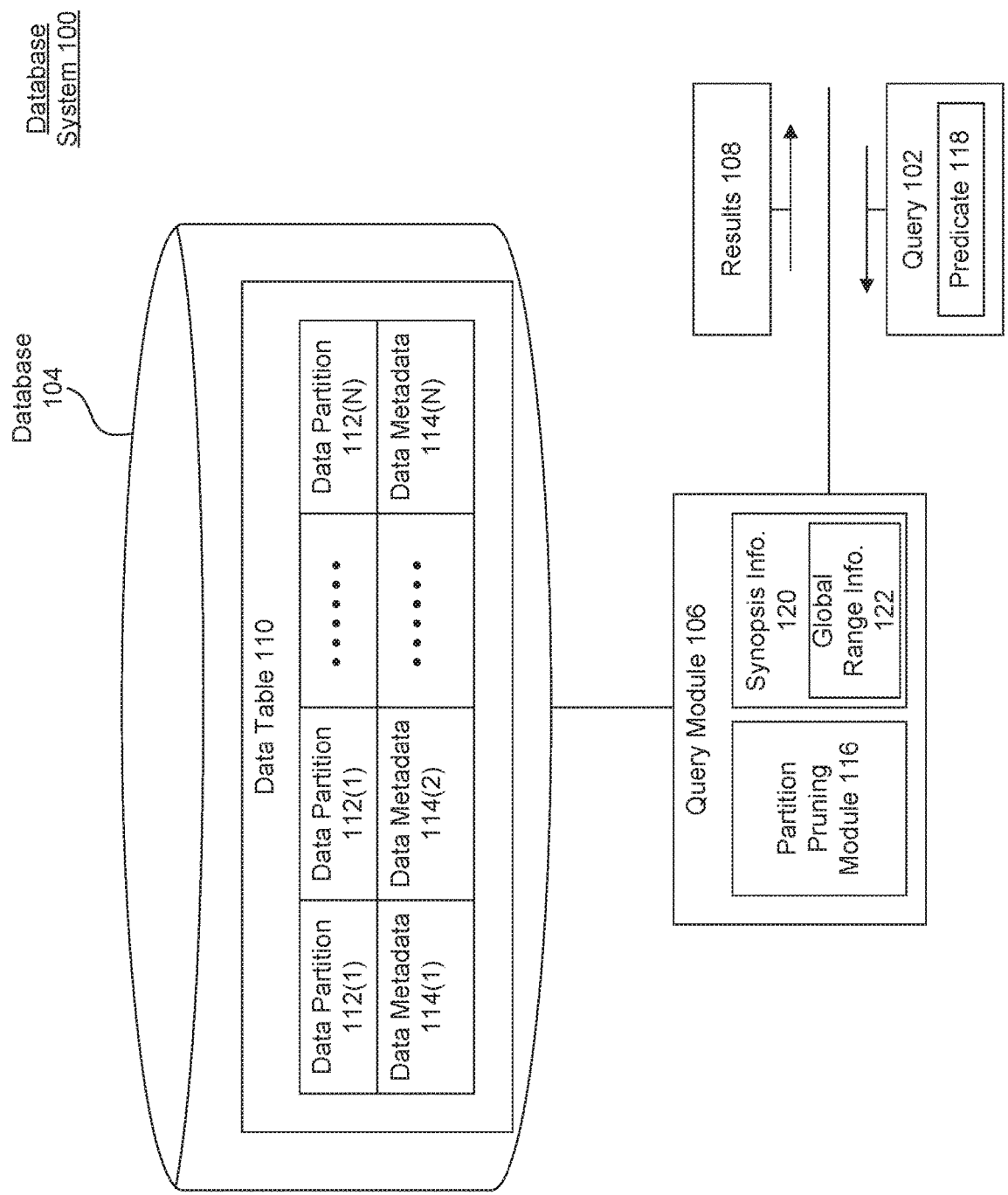
FIG. 1 is a block diagram illustrating examples of a database system with partition pruning capabilities, according to some embodiments.

FIG. 1 illustrates an example embodiment of a database system 100 that processes a query 102 over a data volume (e.g., the database 104). "Query," as used herein, refers to a semantic construction that facilitates gathering and processing information. Further, the query 102 may be expressed in a database query language (e.g., SQL), an object query language, a natural language, and so forth. In some embodiments, a human user or a computer process seeking to retrieve data from the database 104 may provide the query 102 to a query module 106 of the database system 100. In response, the query module 106 may execute the query 102, and determine query results 108 including information from the database 104 corresponding to the query 102.

As illustrated in FIG. 1, the database 104 includes a partitioned data table 110. The data table 110 is partitioned into N data partitions 112(1)-(N). In some embodiments, the data partitions 112(1)-(N) can include data represented as an alphanumeric string, integer, decimal, floating point, date, time, binary, boolean, and/or enumeration. Further, each data partition 112 is associated with data partition metadata 114. For instance, data partition 112(1) is associated with data partition metadata 114(1), data partition 112(N) is associated with data partition metadata 114(N), and so forth. The data partition metadata 114 includes detailed information about the contents of the data partitions 112. For example, the data partition metadata 114(1) may describe one or more attributes (e.g., size, data values, column data distribution within the partition, etc.) of the data of the data partition 112(1). As another example, the data partition metadata 114(1) may include information identifying the minimum data value and maximum data value of an associated data partition 112(1). As yet still another example, the data partition metadata 114(1) may include workload information that may be used to determine a popularity ranking of column values associated with the data partition 112(1).

In some embodiments, the popularity $C[v]$ of a column value v refers to the number of predicates of a historic workload satisfied by v divided by the total number of predicates $|Pred|$. Thus, a column value is popular if the column value has satisfied a high amount of query predicates over a period of time. In other words, the more query predicates a column value can satisfy, the higher the popularity ranking of the column value.

As illustrated in FIG. 1, the query module 106 includes a partition pruning module 116 that may implement one or more performance measures to improve the performance of the database system 100 when processing the query 102. In some embodiments, the partition pruning module 116 may implement partition pruning with respect to queries processed by the query process system 100. For example, the partition pruning module 116 may prune the number of data partitions 112 that are accessed by the query module 106 when executing the query 102. "Partition pruning," as used herein, refers to determining whether a data partition includes data that satisfies a query, and preventing a query module from loading the data partition into memory when the data partition does not include data that satisfies the query.

As an example, the partition pruning module 116 may analyze a predicate 118 (e.g., a conditional statement associated with a FROM or WHERE clause) included in the query 102 to determine which partitions 112(1)-(N) should be retrieved and loaded into memory in order to execute the query 102. Partition pruning dramatically reduces the amount of data retrieved from disk and shortens processing time, thus improving query performance and optimizing resource utilization.

In some embodiments, the partition pruning module 116 implements synopsis-based partition pruning in order to avoid the unnecessary loading of data partitions 112 unrelated to the query 102 during the execution of the query 102. As such, the partition pruning module 116 may maintain global synopsis information 120, Additionally, the partition pruning module 116 may prune the data partitions 112(1)-(N) based at least in part on the global synopsis information 120. For example, the partition pruning module 116 may determine which data partitions 112(1)-(N) to load into memory during execution of the query 102 based on information describing the data partitions 112(1)-112(N) included in the global synopsis information 120.

In one embodiment, the global synopsis information 120 includes global range information 122 (e.g., a global range table) that includes range information global to the data partitions 112(1)-(N). For example, the global range information 120 may include an index of global data ranges over a particular column of the data table 110. Additionally, the query module 106 may encode the data partitions 112 and the predicate 118 using the global range information 120, and employ the resulting bit vectors to prune the data partitions 112(1)-(N) when processing the query 102.

For example, the partition pruning module 116 may determine a data partition bit vector corresponding to the data partition 112(2) based on the global range information 122 and the content of the data partition 112(1). Further, the partition pruning module 116 may determine a predicate bit vector based on the global range information 122 and the predicate 118. In addition, the partition pruning module 116 may perform a bitwise AND operation using the data partition bit vector and the predicate bit vector. If the bitwise operation result equals 0, the partition pruning module 116 may prune the data partition 112(2) when processing the query 102.

Figure 2:
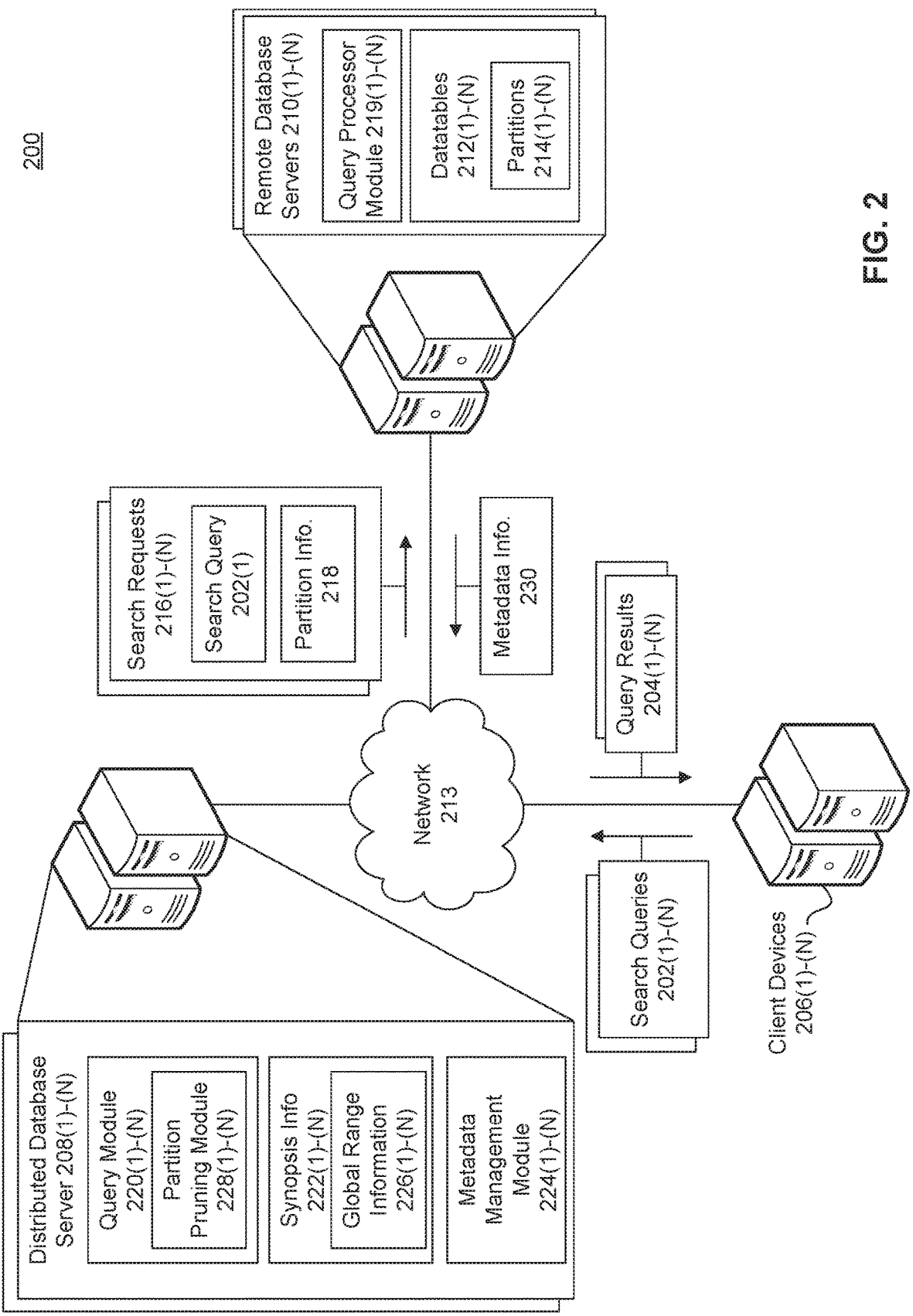
FIG. 2 is a block diagram illustrating examples of a distributed database system with partition pruning capabilities, according to some embodiments.

FIG. 2 illustrates an example embodiment of a distributed database system 200 that processes a search query 202 and determines a query result 204. As illustrated in FIG. 2, the distributed database system 200 includes a plurality of client devices 206(1)-(N), a distributed database server 208, and a plurality of remote database servers 210(1)-(N) storing a plurality of partitioned data tables 212(1)-(N). Some examples of the client devices 206 include desktops, laptops, and netbooks; tablet computing devices; smart phones, mobile communication devices, and any other computing device capable of sending communications to distributed database server 208. Further, in some embodiments, the distributed database server may store one or more the plurality of partitioned data tables 212(1)-212(N).

In some embodiments, the plurality of client devices 206(1)-(N), the distributed. database server 208, and the plurality of remote database servers 210(1)-(N) exchange data requests (e.g., search queries 202(1)-(N)) and data responses (e.g., query responses 204(1)-204(N)) via a communication network(s) 213. The communication network(s) 213 may include any or all of a private network, personal area network (PAN), Local-Area Network (LAN), Wide-Area Network (WAN), or the Internet. Further, the connection between any of the plurality of client devices 206(1)-(N), the distributed database server 208, or the plurality of remote database servers 210(1)-(N), and the communication network(s) 213 may be a wireless connection (e.g., Bluetooth, Wi-Fi connection, etc.), or a wired connection (e.g., Ethernet, universal serial bus (USB), etc.).

As illustrated in FIG. 2, the plurality of client devices 206(1)-(N) send, to the distributed database server 208, search queries 202(1)-(N) to be processed over the data of the partitioned data tables 212(1)-(N). In some embodiments, the partitioned data tables 212(1)-(N) can include data represented as an alphanumeric string, integer, decimal, floating point, date, time, binary, boolean, and/or enumeration. Further, the queries 202(1)-(N) may be expressed in a database query language (e.g., SQL), an object query language, a natural language, and so forth.

Upon receipt of a search query (e.g., the search query 202(1)) from the client device 206(1), the distributed database server 208 may determine one or more of the remote database servers 210 associated with the search query 202 (1). In some embodiments, the distributed database server 208 may determine the remote database servers 210(1)-(N) associated with the search query 202(1) based on the data partitions 214(1)-(N) stored on the remote database servers 210(1)-(N). Further, the distributed database server 208 may send search requests 216(1)-(N) including the search query 202(1) to each of the remote database servers 210 associated with the search query 202(1). In some embodiments, the search requests 216(1)-(N) may further include partition information 218 identifying the particular data partitions 214 associated with the search query 202(1).

Upon receipt of the search requests 216(1)-(N), the remote database servers 210(1)-(N) may execute the search query 202(1) over the partitioned data tables 212(1)-(N). For example, the remote database server 210(1) may receive the search request 216(1), and determine which of the data partitions 214 stored on the remote database server 210(1) are identified in the partition information 218. Further, the remote database server 210(1) may load the identified data partitions 214 into memory, and execute the search query 202(1) over the identified data partitions 214 to determine the query result 204(1).

Further, the remote database servers 210(1)-(N) may send the query results 204(1)-(N) corresponding to the search query 202(1) to the client device 206(1). In some embodiments, the remote database servers 210(1)-(N) may send the query results 204(1)-(N) to the distributed database server 208, and the distributed database server 208 may send the query results 204(1)-(N) to the client device 206(1). Further, the distributed database server 208 may process the query results 204(1)-(N) before sending the query results 204(1)-(N) to the client device 206(1). For example, the distributed database server 208 may de-duplicate, rank, and/or order the query results 204(1)-(N). In some other examples, the distributed database server 208 may compress the query results 204(1)-(N). In yet still some other examples, the distributed database server 204 may enforce a data authorization policy with respect to the query results 204(1)-(N). For example, the distributed database server 208 may remove content from the query results 204(1)-(N) that the client device 206(1) is not authorized to access.

As illustrated in FIG. 2, the distributed database server 208 may include a query module 220, synopsis information 222(1)-(N), and a metadata management module 224. Additionally, the distributed database server 208 includes one or more servers or other types of computing devices that may be embodied in any number of ways. For instance, the modules, other functional components, and data may be implemented on a single server, a cluster of servers, a server farm or data center, a cloud-hosted computing service, and so forth, although other computer architectures may additionally or alternatively be used.

The query module 220 manages execution of search queries 202(1)-(N) within the distributed database system 200. For example, the query module 220 may receive the search queries 202(1)-(N) from the client devices 206(1)-(N), and manage execution of the search queries 202(1)-(N) over the partitioned data tables 212(1)-(N). Additionally, the query module 220 may send the query results 204(1)-(N) to the client devices 206(1)-(N) in response to execution of the search queries 202(1)-(N).

Additionally, the query module 220 manages the synopsis information 222(1)-(N) corresponding to the data partitions 214(1)-(N) of the partitioned data tables 212(1)-(N). In some embodiments, the synopsis information 222(1)-(N) may include global range information 226(1)-(N) for the data partitions 214(1)-(N). For instance, the synopsis information 222(1) may include the global range information 226(1), the synopsis information 222(N) may include the global range information 226(N), and so forth. The global range information 226 may include an index of global data ranges over a particular column of the data table 212. Additionally, the distributed database server 208 may encode the data partitions 214(1)-(N) and a predicate of a search query 202(1) using the global range information 226, and employ the resulting bit vectors to prune the data partitions 214(1)-(N) when processing the search query 202(1).

As illustrated in FIG. 2, the distributed database server 208 may include a partition pruning module 228 that determines which remote database servers 210(1)-(N) should receive the search requests 216(1)-(N) corresponding to a search query 202(1). As such, the partition pruning module 228 improves the performance of the distributed database system 200 by minimizing the amount of remote database servers 210(1)-(N) required to execute the search queries 202(1)-(N) and/or minimizing the amount of data partitions 214(1)-(N) loaded into memory by the remote database servers 210(1)-(N) to execute the search queries 202(1)-(N). In some embodiments, the partition pruning module 228 identifies the remote database servers 210(1)-(N) that should receive the search requests 216(1)-(N) based on the synopsis information 222(1)-(N).

Figure 5:
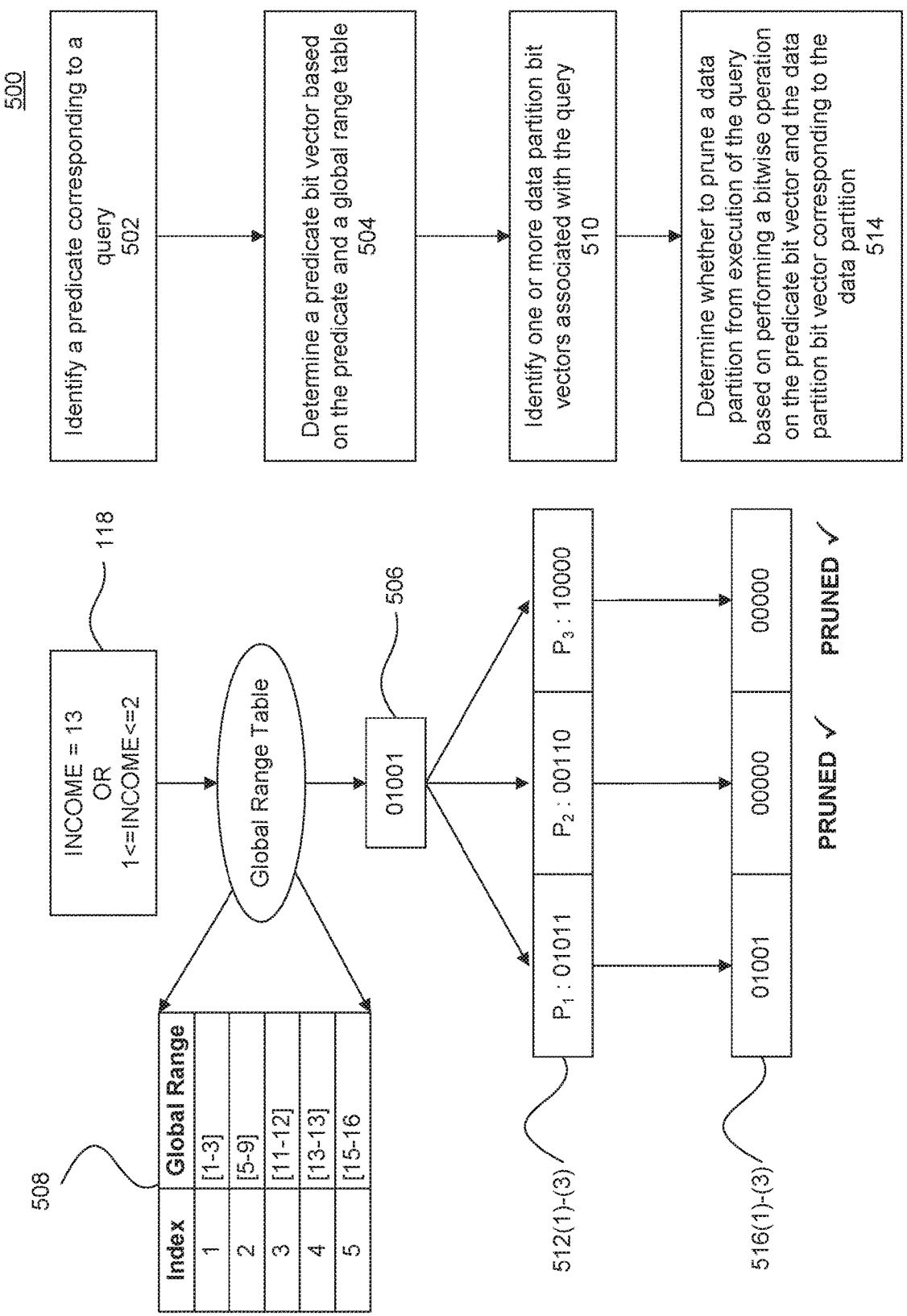
FIG. 5 illustrates a flowchart diagram of a method for partition pruning via a compact global range table, according to embodiments of the present disclosure.

For example, as described with respect to FIGS. 5-6, the partition pruning module 228 may prune the data partitions 214(1)-(N) based at least in part on the global range information 226(1)-(N). For example, the partition pruning module 228 may determine which data partitions 214(1)-(N) to load into memory during execution of the query 202(1) based on information describing the data partitions 214(1)-(N) included in the global range information 226 and a predicate included in the search query 202(1).

For example, the partition pruning module 228 may determine a data partition bit vector corresponding to the data partition 112(2) based on the global range information 132 and the content of the data partition 112(1). Further, the partition pruning module 228 may determine a predicate bit vector based on the global range information 132 and the predicate 118. In addition, the partition pruning module 228 may perform a bitwise AND operation using the data partition bit vector and the predicate bit vector. If the bitwise operation result equals 0, the partition pruning module 228 may prune the data partition 214(2) when processing the search query 202.

Further, the partition pruning module 228 may determine the partition information 218 identifying the data partitions 214 that should be loaded to execute the search query 202(1). Additionally, the partition pruning module 228 may determine which remote database servers 210(1)-(N) should receive the search request 216(1)-(N) based on the data partitions 214(1)-(N) associated with the search query 202(1).

For example, if the partition pruning module 228 determines that a remote database server 210(1) stores a data partition 214(1) that should be loaded to execute the search query 202(1), the query module 220 may send the remote database server 210(1) a search request 216(1) identifying the particular data partition 214(1) in the partition information 218. Upon receipt of the search request 216(1), the remote database server 208(1) may load the particular data partition 214(1) into a memory component of the remote database server 210(1), and execute the search query 202(1) over the particular data partition 214(1).

Further, the metadata management module 224 may maintain and monitor the synopsis information 222(1)-(N).

For example, the metadata management module 224 may receive metadata information 230 indicating changes to the attributes (e.g., distribution, availability, location, etc) of the data partitions 214(1)-(N), and performance results of search queries 202(1)-(N) executed by the remote database servers 210(1)-(N). In some embodiments, the metadata management module 224 may update the synopsis information 222(1)-(N) based at least in part on the metadata information 230.

Figure 3:
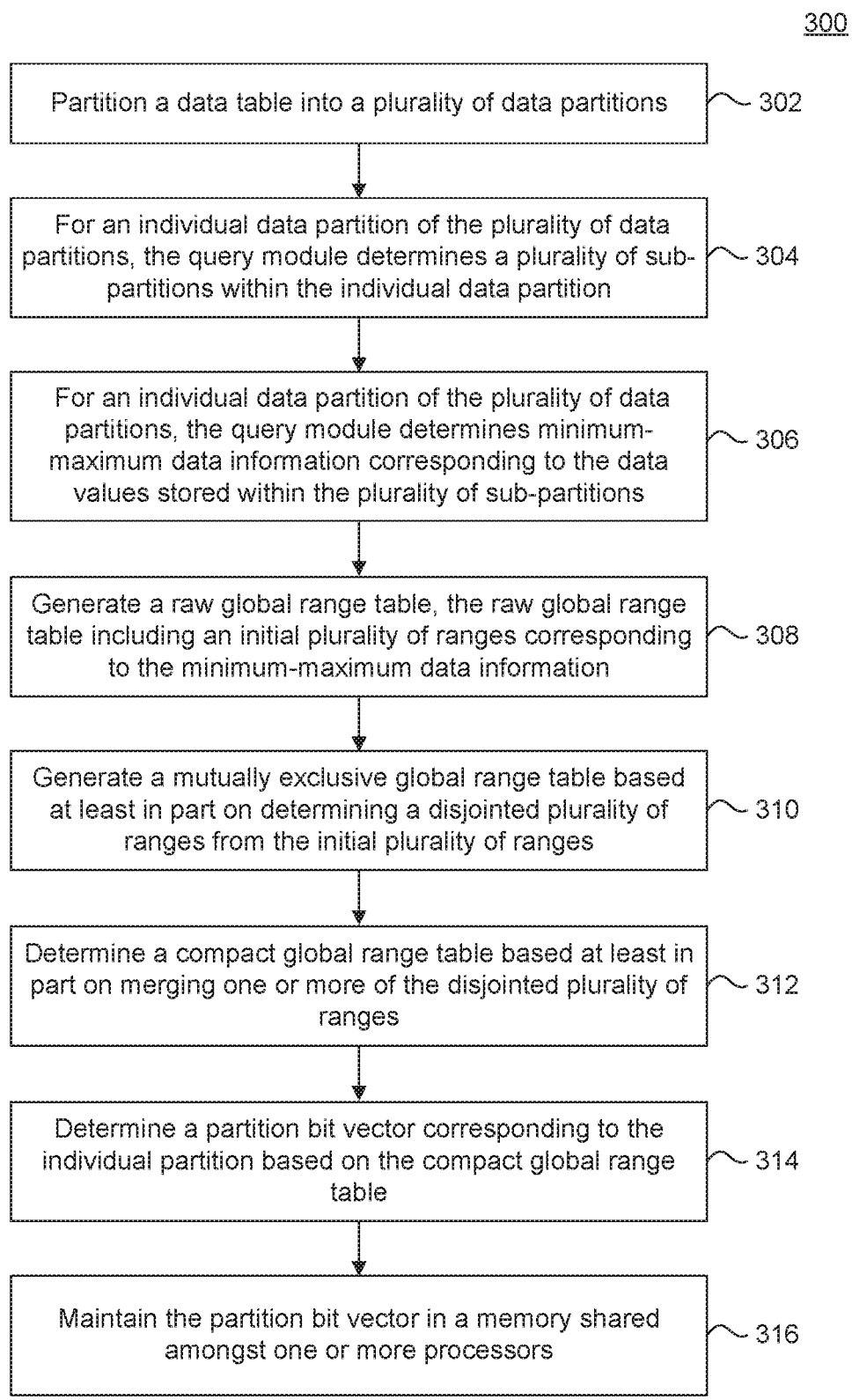
FIG. 3 illustrates a flowchart diagram of a method for determining a global range table, according to embodiments of the present disclosure.

FIG. 3 is a flowchart illustrating example operations for determining a global range table, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

At 302, the database system partitions a data table into a plurality of data partitions. For example, the partition pruning module 116 divides the partitioned data table 110 into the plurality of data partitions 112(1)-(N). In some embodiments, the database 104 may include a column oriented database that stores the content column wise rather than by row. Thus, the data partitions 112(1)-(N) may each store a portion of the column data of the data table 110. Some embodiments described herein provide a solution for column data that includes gaps between data values. Gap, as used herein, may refer to an unrepresented sub-range of data values within a partition value range the range of data values between the minimum data value and the maximum data value of a data partition 112). Moreover, embodiments described herein increase the efficiency of query execution over data tables (e.g., data table 110) where the distribution of data values per partition is sparse.

Further, the data partition metadata 114(1) may include a dictionary of every distinct value that occurs in the portion of the column data, and for each distinct value a list indicating which rows contain the distinct value.

At 304, for a data partition of the plurality of data partitions, the database system determines a plurality of sub-partitions within the data partition. For example, the partition pruning module 116 may sub-divide each data partition 112(1)-(N) into a plurality of sub-partitions.

In some embodiments, the partition pruning module 116 may determine mutually exclusive sub-partitions for the data partitions 112(1)-(N) based on a cost model that relies on popularity rankings of the column data. In particular, the cost model may endeavor to limit the popularity of column data in the gaps within the individual partitions. In an embodiment, the partition pruning module 116 may determine the popularity cost of a gap according to Equation 1 as shown below.

$$\text{Cost of Gap } G = \sum_{v \in V_G} C[v] \quad (1)$$

Where G is a gap, $V_G$ is the set of values contained in the gap G, and the cost of gap for G is defined as the sum of the popularities of the values in G. For each sub-partitions of a data partition 112, let $VG_s$ be the set of values of the gaps that are included in sub-partition s. If a popular value v is in $VG_s$ (i.e. v does not exist in sub-partition s), then those predicates that v satisfies will cause false positives on the data partition 112 to which sub-partition s belongs. In other words, the sub-partition value range will indicate the existence of v even though the v is not present within the sub-partition value range (i.e. an occurrence of false positive).

Further, in some embodiments, the partition pruning module 116 may determine the sub-partitioning cost of a partition according to Equation 2 as shown below.

$$\text{Sub-partitioning Cost of Partition } p = \sum_{s \in Sub_p} \sum_{v \in V_G^S} C[v] \quad (2)$$

Where $Sub_p$ is the set of sub-partitions in the data partition 112. The sub-partitioning cost of a partition represents the likelihood that the sub-partitioning scheme will create false positives for the partition. As such, the partition pruning module 116 endeavors to minimize the sub-partitioning cost of the data partitions 112(1)-(N).

In addition, in some embodiments, the partition pruning module 116 may normalize the sub-partitioning cost of a partition according to Equation 3 as shown below. In some examples, the normalized sub-partitioning cost ranges from 0, inclusive, to 1, exclusive.

$$\text{Normalized Sub-partitioning Cost} = \quad (3)$$
$$\frac{\text{Sub-partitioning Cost}}{\#(\text{max possible distinct values in partition})}$$

Further, the partition pruning module 116 may employ a greedy algorithm to determine a sub-partitioning scheme for sub-dividing the data partitions 112(1)-(N) into the plurality of sub-partitions. For example, the partition pruning module 116 may determine an optimal sub-partitioning scheme according to the greedy algorithm shown below.

```
GreedySubpartitioning(partition, k):
    N^p_v = partition.length
    Init min_heap for k nodes (−infinity, −1)
    for j := 2 to N^p_v do:
        gap := getGap(partition[j−1:j])
        gapCost := getGapValueTotalPopularities(gap)
        if gapCost > heap.root.cost then:
            heap.extract_min( )
            heap.insert((gap, j−1))
    subpartition_range := [ ]
    start := 1
    boundaries := the list of the second field of each node from heap
    boudaries.sort( )
    for i := 1 to boundaries.length do:
        end := boundaries[i]
        subpartition_range.add(partition[start], partition[end])
        start := end + 1
    if start <= N^p_v then:
        subpartition_ranges.add(partition[start], partition[N^p_v])
    return subpartition_ranges
```

At 306, for a data partition of the plurality of data partitions, the database system determines minimum-maximum data information corresponding to the data values stored within the plurality of sub-partitions. For example, the partition pruning module 116 may calculate a tuple including the minimum value of a sub-partition and the maximum value of the sub-partition for each sub-partition. Further, the value range of the sub-partition refers to a set including the values from the minimum data value of the sub-partition to the maximum data value of the sub-partition. As an example, the value range having a minimum data value 3 and a maximum data value 6 includes the following set of numbers {3,4,5,6}.

At 308, the database system generates a raw global range table, the raw global range table including an initial plurality of ranges corresponding to the minimum-maximum data information. For example, the partition pruning module 116 may determine a raw global range table that lists the value ranges (i.e., the initial plurality of ranges) of the individual partitions 112(1)-(N).

At 310, the database system generates a mutually exclusive global range table based at least in part determining a disjointed plurality of ranges from the initial plurality of ranges. For example, the partition pruning module 116 may perform an operation to ensure that every range in the raw global range table is mutually exclusive. In some embodiments, the partition pruning module 116 may employ a greedy algorithm to generate the disjointed plurality of ranges. For instance, the partition pruning module may select the range with the smallest endpoint from the initial plurality of ranges, and insert the selected range into the result list(i.e., the disjointed plurality of ranges) if the selected does not intersect with any other ranges already present in the result list. If the selected range overlaps with a range already present in the result list, the partition pruning module 116 splits the selected range into smaller ranges. Each smaller range is either mutually exclusive or a duplicate (i.e. already completely covered) of the ranges in the result list. Then, the partition pruning module 116 discards the duplicates ranges and inserts the remaining ranges into the results list.

For example, if a result list includes [[1-4], [7-10], [15-16]] and the partition pruning module 116 attempts to insert the range [2-18], the partition pruning module 116 splits the range [2-18] into ranges [[2-4], [5-6], [7-10], [11-14], [15-16], [17-18]]. Since [2-4], [7-10], and [15-16] are already present in the result list, the partition pruning module 116 discards ranges [2-4], [7-10], and [15-16]. Then, the partition pruning module 116 inserts ranges [5-6], [11-14], and [17-18] into the results list. Consequently, the updated result list would include the following ranges [[1-4], [5-6], [7-10], [11-14], [15-16], [17-18]]. If the selected range is already mutually exclusive to the ranges in the result list, the partition pruning module 116 simply inserts the selected range into the results list. Further, the partition pruning module 116 iterates this split-and-insert process for every range in raw global range table to obtain the mutually exclusive global range table where all the ranges are mutually exclusive (i.e., disjointed). One advantage of the mutually exclusive global range table with respect to the raw global range table is that the mutually exclusive global range table has a lower cost than the raw global range table.

In some embodiments, the cost of a global range table may be determined according to Equation 4 as shown below.

$$\text{GRT Cost} = \sum_{r \in GRT} \sum_p (C[v] : v \in V_G^p \cap r \text{ st. } V_G^p \cap r \neq r) \quad (4)$$

Where r is a value range in the global range table, p is a partition, VGp is the set of values of the gaps that are included in partition p, and C[v] is the popularity of v. Additionally, the normalized cost of a global range table may be determined according to Equation 5 as shown below.

$$\text{Normalized } GRT \text{ Cost} = \frac{GRT \text{ Cost}}{\max(\text{domain}) - \min(\text{domain}) + 1} \quad (5)$$

In some embodiments, the Normalized GRT Cost is between 0 and 1, and may be used to quantify how likely the global synopsis information 120 is to have false positives based on a recent workload. Further, the partition pruning module 116 may endeavor to minimize the normalized GRT cost.

At 312, the database system determines a compact global range table based at least in part on merging one or more of the disjointed plurality of ranges. For example, the partition pruning module 116 may merge the disjointed ranges in order to reduce the size of the mutually exclusive global range table and realize spatial benefits within memory. In some embodiments, the partition pruning module 116 may employ a greedy algorithm to merge the disjointed plurality of ranges.

In one embodiment, the partition pruning module 116 may perform a greedy algorithm that constructs an extra-cost list EC with size NR-1, where NR is the number of ranges in the raw global range table. In some examples, $EC_i$ stores the extra-cost of merging the i-th range and the (i+1)-th range. At each iteration of the algorithm, the partition pruning module 116 selects the lowest extra-cost, say $EC_u$, and merges the u-th range and the (u+1)-th range in the mutually exclusive global range table. After each merge, the partition pruning module 116 updates the matrix EC as required. In particular, the partition pruning module 116 invalidates $EC_{u+1}$ as the (u+1)-th range in the mutually exclusive global range table has been merged into the u-th range. If $EC_u$ is the last entry, meaning that the partition pruning module 116 has merged the last two ranges in the mutually exclusive global range table, ECu itself is invalidated. On the other hand, the partition pruning module 116 at most needs to update two entries of EC. If $EC_u$ is not the first or last entry, the partition pruning module 116 re-calculates $EC_{u-1}$ and $EC_u$ using the updated mutually exclusive global range table. Note that $EC_u$ now stores the extra-cost of merging the u-th and (u+2)-th ranges given that the (u+1)-th entry has been invalidated. If $EC_u$ is the first entry, then the partition pruning module 116 only re-calculates $EC_u$ itself. If $EC_u$ is the last entry, then the partition pruning module 116 only re-calculates $EC_{u-1}$, since $EC_u$ itself has been invalidated. Further, the partition pruning module 116 continues selecting the lowest extra-cost and updating EC until the compact global range table becomes the ideal size (i.e. m entries).

In some examples, the partition pruning module 116 may determine the extra cost according to algorithm shown below.

```
CalcExtraCostOfRange(r_a, r_b):
    extra_cost := 0
    for p_1 in all the partitions not mutually exclusive with r_a:
        if p_1 is mutually exclusive with r_b:
            extra_cost += the partition cost of p_1 against r_b
    for p_2 in all the partitions not mutually exclusive with r_b:
        if p_2 is mutually exclusive with r_a:
            extra_cost += the partition cost of p_2 against r_a
    return extra_cost
```

At 314, the database system determines a partition bit vector corresponding to the individual partition based on the compact global range table. For example, the partition pruning module 116 may determine an encoding (i.e., the partition bit vector) for each data partition 112(1)-(N). Further, the partition bit vectors for the data partitions 112(1)-(N) may be stored within the global synopsis information 220. In some embodiments, each bit of a partition bit vector represents an entry in the compact global range table. Further, the i-th bit is set to '1' if and only if the data partition 112 has at least one value within the i-th range in the compact global range table. Otherwise, the i-th bit of the partition bit vector is set to '0'.

At 316, the database system maintains the partition bit vector in a memory shared amongst one or more processors. For example, the query module 106 may maintain (i.e., store) the global synopsis information 220 in memory shared by multiple processes. Further, the global synopsis information 220 may include the partition bit vectors and the compact global range table.

Figure 4:
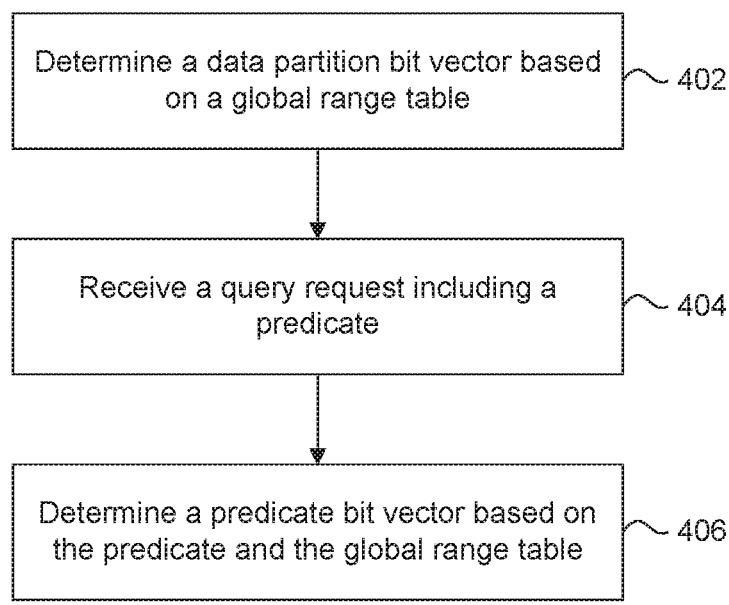
FIG. 4 illustrates a flowchart diagram of a method for encoding a partition bit vector and a predicate bit vector, according to embodiments of the present disclosure.

FIG. 4 is a flowchart illustrating example operations for encoding a partition bit vector and a predicate bit vector, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may he performed simultaneously, or in a different order than shown in FIG. 4, as will be understood by a person of ordinary skill in the art.

At 402, the query module determines a data partition bit vector based on a global range table. For instance, the partition pruning module 116 may determine a partition bit vector for each data partition 112(1)-(N) based on the global range information 122. As an example, if the global range information 122 includes the following range values [[1-3], [5-9], [11-12], [13-13], [15-16]] and the data partition 112(1) includes the following data values {1, 3, 6, 8, 9, 13}, the data partition bit vector for the data partition 112(1) is "01011".

At 404, the query module receives a query request including a predicate. For example, the query module may receive the query 102 that includes the predicate 118 which limits the query results 108 to column data of the data table 110 where x=13 OR 1<=x<=2.

At 406, the query module determines a predicate bit vector based on the predicate and the global range table. For instance, the partition pruning module 116 may determine a predicate bit vector for predicate 118 based on the global range information 122. In some embodiments, each bit of the predicate bit vector represents an entry in the compact global range table. Further, the i-th bit is set to '1' if and only if the data partition 112 has at least one value within the i-th range in the compact global range table. Otherwise, the i-th bit of the predicate bit vector is set to '0'. As an example, if the global range table includes the following range values [[1-3], [5-9], [11-12], [13-13], [15-16]], and the predicate is "x=13 OR 1<=x<=2, " the predicate bit vector for the predicate 118 is "01001" because the values that the predicate 118 covers are only within the ranges [1-3] and [13-13], which are the first and fourth ranges in the global range information 122.

FIG. 5 is a flowchart illustrating example operations for partition pruning via a compact global range table, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

At 502, the query module identifies a predicate corresponding to a query. For example, the query module may receive the query 102 that includes the predicate 118 (i.e., x=13 OR 1<=x<=2).

At 504, the query module determines a predicate bit vector based on the predicate and a global range table. For instance, the partition pruning module 116 may determine a predicate bit vector 506 (i.e., 01001) for predicate 118 based on the global range table 508.

At 510, the query module identifies one or more data partition bit vectors associated with the query. For example, the partition pruning module 116 may determine the data partition bit vectors 512(1)-512(3) corresponding to the data partitions 112(1)-(3), respectively.

At 514, the query module determines whether to prune a data partition from execution of the query based on performing a bitwise operation on the predicate bit vector and the data partition bit vector corresponding to the data partition. For example, the partition pruning module 116 may compare the predicate bit vector 506 to each of the data partition bit vectors 512(1)-512(3) using bitwise AND operations to determine result bit strings 516(1)-(3), respectively. If the result bit string 516 has at least one bit set to '1', the corresponding partition 112 may include one or more values that satisfy the predicate 118 and should not be pruned, Further, if the result bit string 516 does not include a bit set to '1', the corresponding partition 112 does not include a data value that satisfies the predicate 118 and should be pruned. For example, the result bit strings 516(2)-(3) do not include a bit set to '1'. Therefore, the partition pruning module 116 prunes data partitions 112(2)-112(3) during execution of the query 102.

FIGS. 6A-6B illustrate data structures representing information of a partitioned data table, according to embodiments of the present disclosure. FIG. 6A illustrates the table data 602 that includes one or more rows and columns of data. FIG. 6B illustrates a relationship between data partitions (e.g., the data partitions 112(1)-(N), sub-partitions of the data partitions 112(1)-(N), value ranges of the sub-partitions, and data partition bit vectors (e.g., 512(1)-(3)).

Figure 7:
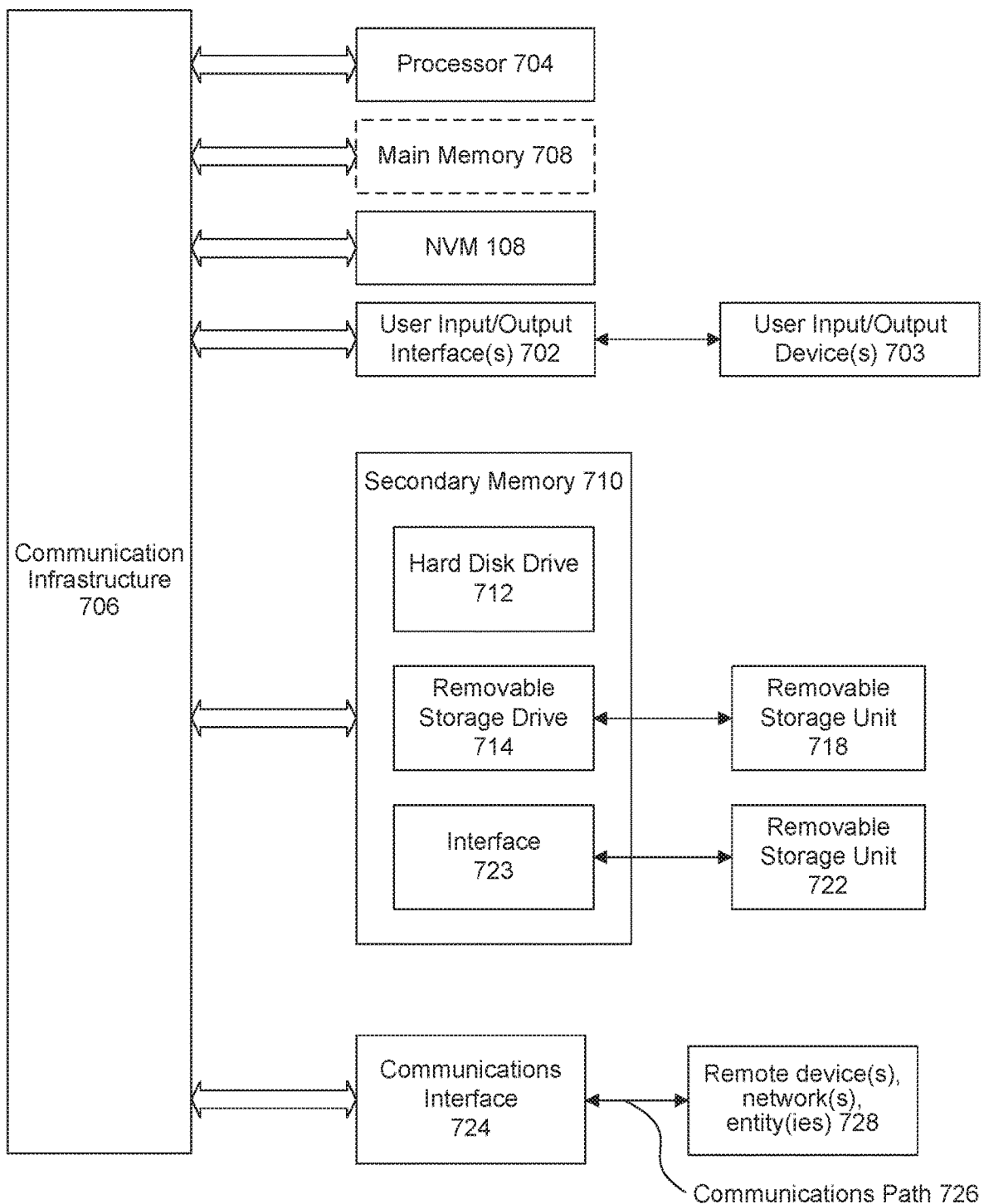
FIG. 7 illustrates a block diagram of a general purpose computer that may he used to perform various aspects of the present disclosure.

FIG. 7 is an example computer system 700 useful for implementing various embodiments. Various embodiments can be implemented, for example, using one or more well-known computer systems, such as computer system 700 shown in FIGS. 1-2. Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). in an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data. In an embodiment, main memory 708 may include both volatile memory 707 and non-volatile memory 709. Non-volatile memory 709 may correspond to persistent memory 110 described herein. Volatile memory 707 may include any memory or storage that resets or does not persist on a power cycle of computer system 700.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 723. Examples of the removable storage unit 722 and the interface 723 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 622, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 7. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment." "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

Additional views and embodiments are illustrated within Appendix A submitted herewith, which forms a part of this application.

What is claimed is:

1. A method, comprising:
   partitioning a data table into a plurality of data partitions, wherein:
   the data table comprises column data that comprises gaps between data values,
   each of the gaps is indicative of an unrepresented sub-range of the data values within a partition value range, and
   the partition value range is a range of the data values between a minimum data value and a maximum data value of a data partition;
   for an individual data partition of the plurality of data partitions:
   determining, based on a set of gap costs for the set of gaps determined using a largest-gap greedy algorithm, a plurality of sub-partitions within the individual data partition, wherein:
   each gap in the set of gaps comprises a plurality of data values,
   each data value in the plurality of data values has a popularity value, and
   the gap cost for each gap in the set of gaps is determined by summing the popularity values of the plurality of data values in each gap;
   determining minimum-maximum data information corresponding to the data values stored within the plurality of sub-partitions;
   generating a raw global range table, the raw global range table including an initial plurality of ranges corresponding to the minimum-maximum data information;
   generating a mutually exclusive global range table based at least in part on determining a disjointed plurality of ranges from the initial plurality of ranges;
   determining a compact global range table based at least in part on merging one or more of the disjointed plurality of ranges;
   determining a partition bit vector corresponding to the individual partition based on the compact global range table; and
   maintaining the partition bit vector in a memory shared amongst one or more processors.

2. The method of claim 1, further comprising:
receiving a query request including a predicate; and
determining a predicate bit vector based at least in part on the predicate and the compact global range table.

3. The method of claim 2, further comprising:
determining a bitwise result based on performing a bitwise operation on the partition bit vector and the predicate bit vector; and
pruning the individual data partition based at least in part on the bitwise result.

4. The method of claim 2, further comprising:
loading the individual partition into the memory based at least in part on the partition vector and the predicate bit vector; and
performing a search over the individual partition based at least in part on the query request.

5. The method of claim 2, further comprising:
pruning the individual partition based at least in part on the partition vector and the predicate bit vector;
loading at least one other individual partition into the memory; and
performing a search over the at least one other individual partition based at least in part on the query request.

6. The method of claim 1, wherein determining the plurality of sub-partitions within the individual data partition further comprises:
determining the plurality of sub-partitions within the individual data partitions based at least in part on popularity ranking information of column data stored within the individual data partition.

7. The method of claim 1, wherein determining the compact global range table based at least in part on merging the one or more of the disjointed plurality of ranges, further comprises:
merging the one or more of the disjointed plurality of ranges based on a cost function.

8. The method of claim 1, wherein determining the partition bit vector corresponding to the individual partition based on the compact global range table, further comprises:
setting an individual bit of the partition bit vector to 1 based on the individual partition including data within a range of the compact global range table corresponding to the individual bit.

9. The method of claim 1, wherein determining the partition bit vector corresponding to the individual partition based on the compact global range table, further comprises:
setting an individual bit of the partition bit vector to 0 based on the individual partition not including data within a range of the compact global range table corresponding to the individual bit.

10. The method of claim 1, wherein the determining, the plurality of sub-partitions comprises:
determining the gap cost for each gap in the set of gaps;
determining a subset of gaps based on the gap cost for each gap in the set of gaps, wherein a total number of gaps in the subset of gaps is less than a total number of sub-partitions in the plurality of sub-partitions; and
determining the plurality of sub-partitions based on the subset of gaps.

11. A non-transitory computer-readable device having instructions stored thereon that, when executed by at least one computing device, causes the at least one computing device to perform operations comprising:
partitioning a data table into a plurality of data partitions, wherein:
the data table comprises column data that comprises gaps between data values,
each of the gaps is indicative of an unrepresented sub-range of the data values within a partition value range, and
the partition value range is a range of the data values between a minimum data value and a maximum data value of a data partition;
for an individual data partition of the plurality of data partitions:
determining, based on a set of gap costs for the set of gaps determined using a largest-gap greedy algorithm, a plurality of sub-partitions within the individual data partition, wherein:
each gap in the set of gaps comprises a plurality of data values,
each data value in the plurality of data values has a popularity value, and
the gap cost for each gap in the set of gaps is determined by summing the popularity values of the plurality of data values in each gap;
determining minimum-maximum data information corresponding to the data values stored within the plurality of sub-partitions;
generating a raw global range table, the raw global range table including an initial plurality of ranges corresponding to the minimum-maximum data information;
generating a mutually exclusive global range table based at least in part on determining a disjointed plurality of ranges from the initial plurality of ranges;
determining a compact global range table based at least in part on merging one or more of the disjointed plurality of ranges;
determining a partition bit vector corresponding to the individual partition based on the compact global range table; and
maintaining the partition bit vector in a memory shared amongst one or more processors.

12. The non-transitory computer-readable device of claim 11, the operations further comprising:
receiving a query request including a predicate; and
determining a predicate bit vector based at least in part on the predicate and the compact global range table.

13. The non-transitory computer-readable device of claim 12, the operations further comprising:
determine a bitwise result based on performing a bitwise operation on the partition bit vector and the predicate bit vector; and
pruning the individual data partition based at least in part on the bitwise result.

14. The non-transitory computer-readable device of claim 12, the operations further comprising:
loading the individual partition into the memory based at least in part on the partition vector and the predicate bit vector; and
performing a search over the individual partition based at least in part on the query request.

15. The non-transitory computer-readable device of claim 12, the operations further comprising:
pruning the individual partition based at least in part on the partition vector and the predicate bit vector;
loading at least one other individual partition into the memory; and
performing a search over the at least one other individual partition based at least in part on the query request.

16. The non-transitory computer-readable device of claim 11, wherein determining the plurality of sub-partitions within the individual data partition further comprises:
determining the plurality of sub-partitions within the individual data partitions based at least in part on popularity ranking information of column data stored within the individual data partition.

17. The non-transitory computer-readable device of claim 11, wherein determining the partition bit vector corresponding to the individual partition based on the compact global range table, further comprises:
setting an individual bit of the partition bit vector to 0 or 1 based on whether the individual partition includes data within a range of the compact global range table corresponding to the individual bit.

18. A distributed database system, comprising:
a communication interface;
a first memory including a data table partitioned into a plurality of data partitions, wherein:
the data table comprises column data that comprises gaps between data values,
each of the gaps is indicative of an unrepresented sub-range of the data values within a partition value range, and
the partition value range is a range of the data values between a minimum data value and a maximum data value of a data partition; and
one or more processors coupled to a second memory and configured to:
determine, based on a set of gap costs for the set of gaps determined using a largest-gap greedy algorithm, a plurality of sub-partitions within an individual data partition of the plurality of data partitions, wherein:
each gap in the set of gaps comprises a plurality of data values,
each data value in the plurality of data values has a popularity value, and the gap cost for each gap in the set of gaps is determined based on a summation of the popularity values of the plurality of data values in each gap;

determine minimum-maximum data information corresponding to the data values stored within the plurality of sub-partitions;

generate a raw global range table, the raw global range table including an initial plurality of ranges corresponding to the minimum-maximum data information;

generate a mutually exclusive global range table based at least in part on determining a disjointed plurality of ranges from the initial plurality of ranges;

determine a compact global range table based at least in part on merging one or more of the disjointed plurality of ranges;

determine a partition bit vector corresponding to the individual partition based on the compact global range table; and maintain the partition bit vector in the second memory shared amongst the one or more processors.

19. The distributed database system of claim 18, the one or more processors further configured to:

receive, via the communication interface, a query request including a predicate; and determine a predicate bit vector based on the predicate and the compact global range table.

20. The distributed database system of claim 19, the one or more processors further configured to:

determine a bitwise result based on performing a bitwise operation on the partition bit vector and the predicate bit vector; and prune the individual data partition based on the bitwise result.

21. The distributed database system of claim 18, wherein the first memory is located in a remote database server, the second memory is located in a distributed database server, and wherein the one or more processors are further configured to:

receive, from a client device, a query request including a predicate via the communication interface;

determine a predicate bit vector based at least in part on the predicate and the compact global range table;

determine that the query request is associated with a remote data node based on the predicate bit vector;

send, via the communication interface, the query request to the remote database server;

receive, via the communication interface, search results from the remote database server; and send, via the communication interface, the search results to the client device.

* * * * *